UNITED STATES PATENT OFFICE.

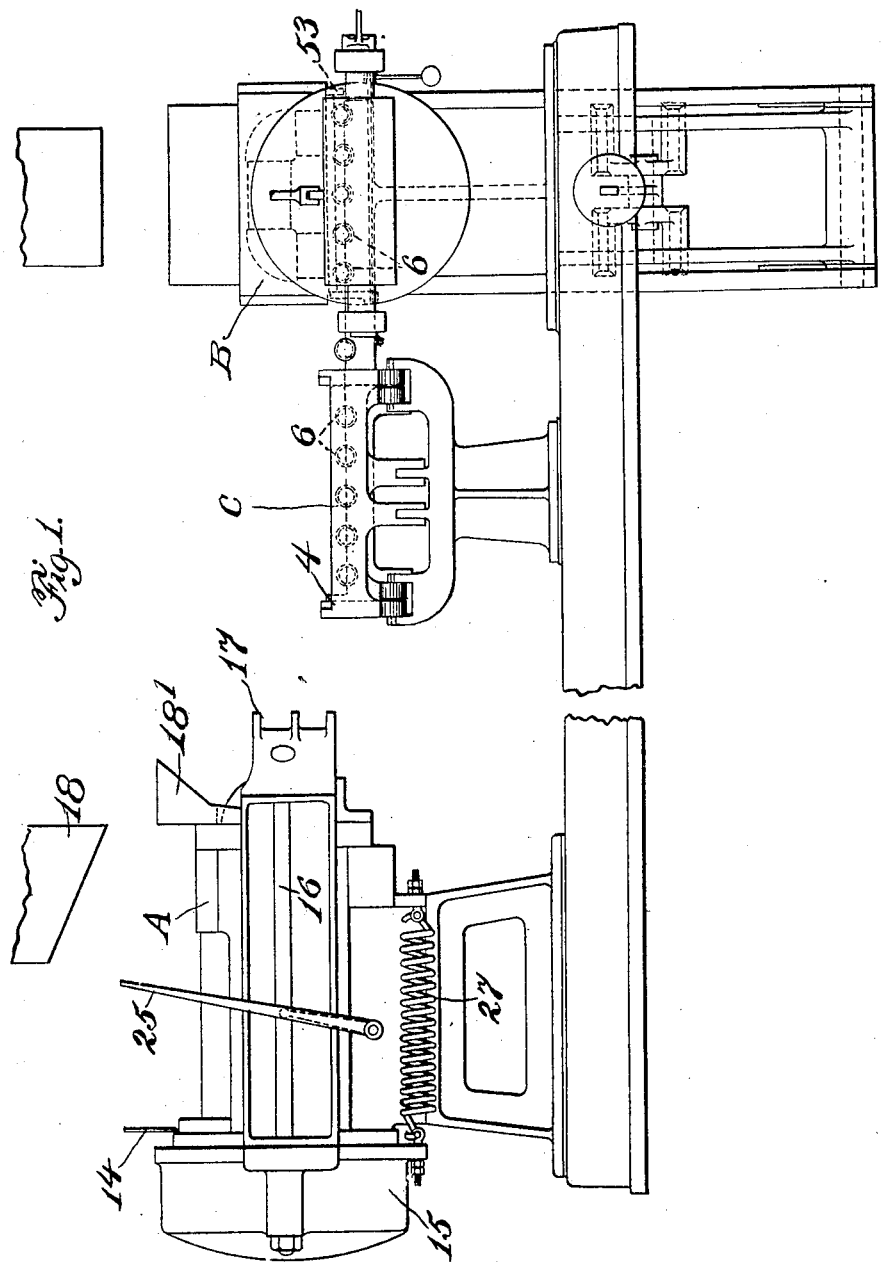

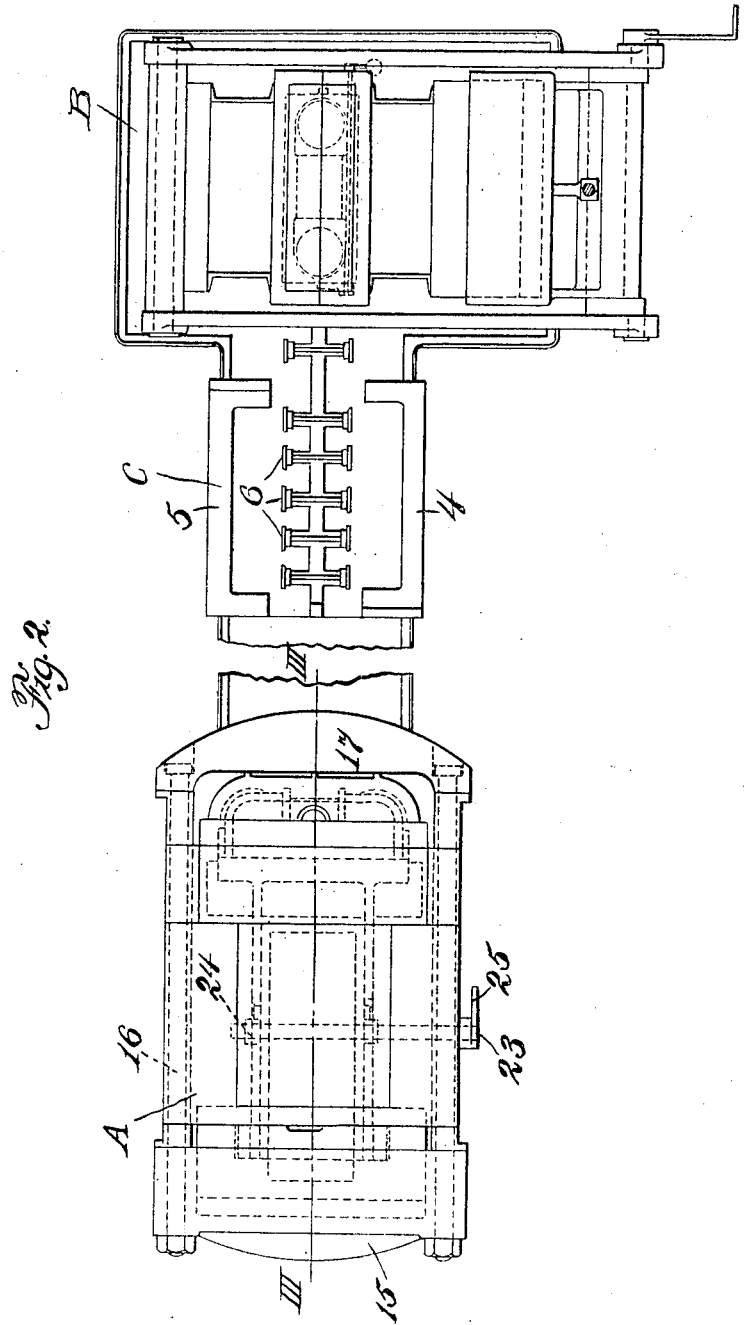

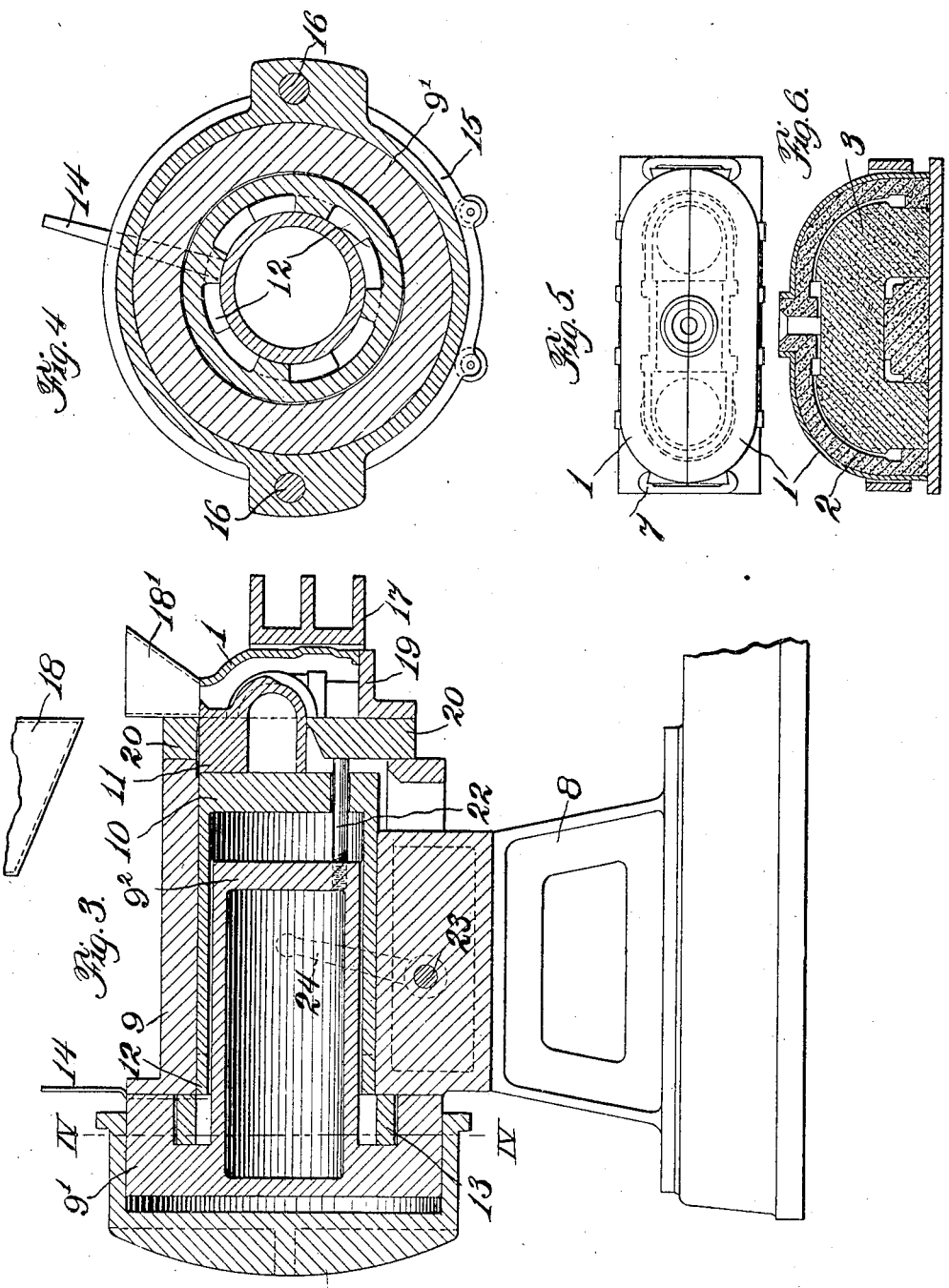

WILLIAM W. DOOLITTLE, OF EVANSTON, ILLINOIS, ASSIGNOR TO CRANE COMPANY, OF CHICAGO, ILLINOIS, A CORPORATION OF ILLINOIS.

MOLDING-MACHINE.

No. 878,510.      Specification of Letters Patent.      Patented Feb. 11, 1908.

Application filed August 9, 1906. Serial No. 329,887.

To all whom it may concern:

Be it known that I, WILLIAM W. DOOLITTLE, a citizen of the United States, residing at Evanston, in the county of Cook and State of Illinois, have invented certain new and useful Improvements in Molding-Machines, of which the following is a specification.

My invention relates to molding machines for preparing molds, and has for its objects; to provide an improved form of mechanism wherein the molds may be formed more rapidly and conveniently than has heretofore been done; to provide an improved form of mechanism in which the stroke for freeing the flask and mold is independent of the power means for compressing the sand, thereby increasing the economy of the power compressing means, as well as securing certain other advantages, and, finally, to provide a simplified form of machine, which may be built and operated at a minimum expense. These and other objects are attained by my invention one form of which is shown in the accompanying drawings in which, Figure 1 is a side elevation of the assembled machine, Figure 2 is a plan view thereof, Figure 3 is a longitudinal section through the mold forming mechanism on the line III—III of Figure 2, Figure 4 is a transverse section through the mold forming mechanism on the line IV—IV of Figure 3, Figure 5 is a plan view of the mold flask in assembled position, and Figure 6 is a vertical section through the flask, mold and core of Figure 5.

The mechanism in its complete form is designed to form molds for articles requiring large green sand cores such as double pipe elbows (see Fig. 6) and consists of the three main parts, viz, the mechanism for forming the body of the mold in sections in flasks, which particularly constitutes the subject-matter of this application, the mechanism for forming the green sand cores, which is shown and claimed particularly in co-pending divisional application No. 343,315 and the mechanism for carrying the cores into position and for assembling them in the sectional molds prepared in the first mentioned mechanism, which assembling mechanism is shown and claimed in my co-pending divisional application No. 343,316. Referring first briefly to the general arrangement as shown in Figures 1 and 2, A is the mechanism for forming the body of the mold, which mechanism comprises a compressing mechanism adapted to carry a pattern on one of the relatively movable parts and a half flask on the other of the movable parts, which half flask is a hollow metal part (see parts 1—1 of Figs. 5 and 6), between which pattern and flask member the mold 2 of Figure 6 is formed. B is the mechanism for forming the green sand core 3 of Fig. 6, which mechanism comprises two relatively movable jaws for carrying half molds, together with power means for bringing them together, and C is the assembling mechanism comprising two tables 4 and 5 movable toward and from each other and each adapted to carry a half flask 1 with its mold (Fig. 2). Intermediate the two tables 4 and 5 are a series of rollers 6 extending underneath the core forming molds in the mechanism B, and constituting a track on which the core plate of the core is conveyed to the assembling table. When the sectional half molds are placed on the tables 4 and 5 and the core is carried to its central position therebetween, the tables are moved together thereby inclosing the core, and the locking clamp 7 (Fig. 5) is applied to hold the half sections together.

The mechanisms for forming the mold body 2 (Fig. 6), which mechanism is shown in assembled views 1 and 2 and cross section views 3 and 4, will now be described in detail. Referring first more particularly to Figs. 3 and 4, 8 is the supporting base of the mechanism which base carries rigidly secured thereto, the cylindrical supporting member 9, which member 9 has a separable head portion 9' provided with a forwardly extending guide portion $9^2$. Slidably mounted in the supporting member 9 and also guided by the part $9^2$ is the pattern carrying member 10 which has secured at one end thereof the pattern 11, and at the other end is provided with a series of teeth 12 (Fig. 4) adapted to fit in spaces between corresponding teeth in the rotatable ring 13, which ring lies behind the member 10, when such member 10 is in its advance position. The ring 13 is provided with the handle 14 whereby the pattern carrying member 10 may be positively held in advanced position or by a rotative movement of the ring 13, allowed to move to the left. Also slidably carried by the separable head portion 9' of the supporting member 9 is the cylinder 15 which fits over the head of such supporting member and constitutes therewith a hydraulic operating ram, means (not shown) being provided for supplying fluid between the cylinder and the part 9' which is in effect a piston. This ram constitutes a power compressing means for the device and is connected by longitudinal rods 16—16 (see Figs. 1 and 2) with the cross head 17 at the front of the machine whereby such cross head may be moved back and forth. The half flask 1, shown in Figure 5, is inserted between the cross head 17 and the pattern 11, and sand having been admitted therebetween from the receptacle 18 and hopper 18', fluid pressure is admitted to the cylinder 15 and the parts moved to the position shown in Figure 3. In order to support the flask and the sand therein, the plate 19 is provided, which plate is secured to the ring member 20, which member constitutes in effect the lower and edge portions of the pattern plate. The distance of this ring 20 from the stationary part $9^2$ is regulated by means of a distance or spacing member 22. Referring again to the cylindrical pattern supporting member 10, means are provided for operating such member comprising the shaft 23 and a pair of projecting arms 24 engaging in cam slots at the sides of such member 10. The shaft 23 is rotated by means of the lever 25 at the end of such shaft shown, in Figures 1 and 2. The operation of this part of the mechanism is as follows:

Sand from the receptacle 18 having been admitted to the space between the pattern 11 and the flask 1, the cross head 17 is moved up to the position shown by means of the fluid pressure cylinder, thereby compressing the sand between the flask and the pattern. The fluid pressure is now released from the cylinder 15 and the cross head moved back by means of the springs 27 (Figure 1) which are secured to the stationary base and to the flange of the cylinder 15. It will be seen that this slight movement is not sufficient to free the flask and the mold formed therein from the pattern for the reason that the pattern is an irregular one and projects into the mold. It is therefore necessary that the pattern 11 be moved to the left, and this is accomplished by means of the ring and tooth mechanism. The ring can be turned by means of the handle 14 to such a position that the teeth 12 on the member 10 register with the spaces of the teeth on the ring and such member 10 can now be moved to the left by means of the handle 25. The flask with its mold is now entirely free and can be easily removed from the mechanism. The other half of the mold 2 is then formed similarly and such parts are ready for assembling on the assembling device C.

It will be noticed that in the foregoing construction a very slight movement of the power mechanism is necessary in order to accomplish the desired result, which slight motion is made possible because of the fact that the part 10 can be moved independently thereof and so relieve the mold from the pattern. An economical power device is thus secured as the pressure is applied only for the compressing portion of the stroke, and is not used in freeing the pattern, which operation requires very little power. It will be apparent that if desired, the general construction of Figure 3 might be used for forming cores instead of hollow molds 2, as a pattern member might be secured to the member 17 instead of the flask 1, which change is of course obvious to those skilled in the art. I have therefore, in the claims, not restricting the parts 10 and 17 to pattern and flask carrying members, but have referred to such members broadly as molding members.

Various modifications of my device might be made without departing from the spirit thereof. As previously stated, the mechanism of Figure 3 might be modified to form cores by applying thereto molds similar to those of the core forming mechanism. It will also be apparent that the relative positions of the parts of the construction of Figure 3 might be considerably changed. If desired, the cross head 17 might be provided with a movable flask releasing member instead of the part 10 in the stationary member 9. These and other modifications which will occur to those skilled in the art, are comprehended by my invention and intended to be covered by the claims.

Having thus described my invention, and illustrated its use, what I claim as new and desire to secure by Letters Patent, is the following:

1. In combination, a supporting member, a toothed rotatable ring located therein, a member mounted slidingly upon the first member and having teeth corresponding to those on the ring, a pattern mounted thereon, a second molding member movable relatively to the supporting member, means for rotating the ring, and means for moving the sliding toothed member back and forth.

2. In combination, a main supporting member, a molding member slidingly supported upon such first member for horizontal movement, means for moving such sliding member back and forth and for positively holding it in its advanced position, a second molding member movable relative to the main supporting member, in a horizontal plane and a fluid operated actuating means for moving the second molding member relatively to the slidingly mounted molding member to compact the sand between the members.

3. In combination, a horizontal flask supporting member 19, a flask 1 supported edgewise thereon, a pattern carrying member 10, a supporting member on which the pattern carrying member is mounted for longitudinal movement, a cross head for engaging the back of the flask, power means for moving the pattern carrying member and cross head toward and from each other and means for moving and holding the pattern carrying member independent of the power means upon the supporting member either in advanced or retracted position.

4. In combination, a supporting base, a pattern carrying member and flask operating means mounted thereon for relative lateral movement toward and from each other, means for slidably supporting a flask on one of its edges intermediate the pattern carrying member and the flask operating means, and power means for moving the pattern carrying member and the flask operating means toward each other.

5. In combination, a supporting base, a pattern carrying member and flask operating means mounted thereon for relative lateral movement toward and from each other, means for slidably supporting a flask on one of its edges intermediate the pattern carrying member and the flask operating means, power means for moving the pattern carrying member and the flask operating means toward each other, and spring means for separating such parts.

6. In combination, a supporting base, a pattern carrying member and flask operating means mounted thereon for relative lateral movement toward and from each other, means whereby the pattern carrying means may be moved back and forth longitudinally and held in advanced or retracted position, means for slidably supporting a flask on one of its edges intermediate the pattern carrying member and the flask operating means, and power means for moving the pattern carrying member and the flask operating means toward each other.

7. In combination, a supporting member, a pattern carrying member mounted thereon for lateral movement, means for reciprocating said pattern carrying member, means for locking the pattern carrying member in advanced position, an operating ram mounted on the rear end of the supporting member, a cross head for moving a flask toward the pattern carrier and connecting means extending from the ram to the cross head.

In testimony whereof I have hereunto signed my name in the presence of the two subscribed witnesses.

WILLIAM W. DOOLITTLE.

Witnesses:
 PAUL CARPENTER,
 JAMES NICHOLAS LORENZ.